Sept. 12, 1950     T. McGRATH     2,522,458
FREEZING MACHINE
Filed Feb. 19, 1946     3 Sheets—Sheet 1
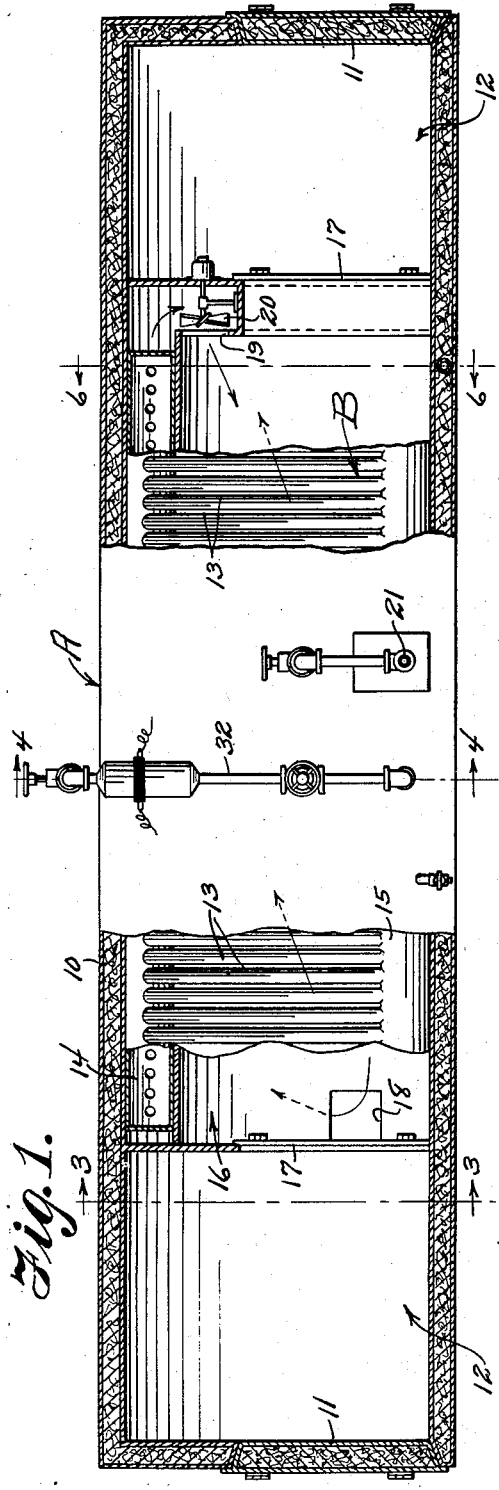
INVENTOR.
Thomas McGrath
BY Victor J. Evans & Co.
ATTORNEYS Sept. 12, 1950 T. McGRATH 2,522,458
FREEZING MACHINE
Filed Feb. 19, 1946 3 Sheets-Sheet 2
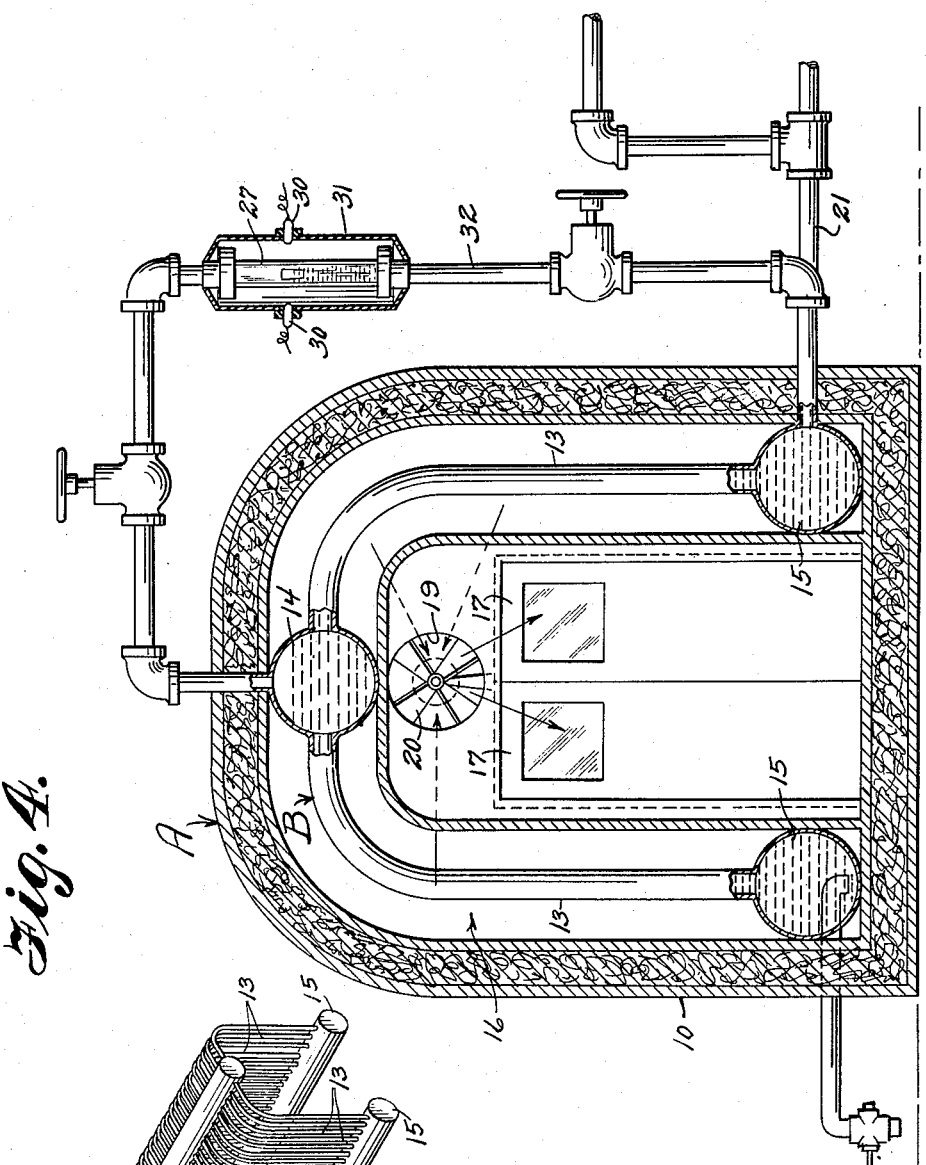
INVENTOR.
Thomas McGrath
BY Victor J. Evans & Co.
ATTORNEYS Sept. 12, 1950     T. McGRATH     2,522,458
FREEZING MACHINE
Filed Feb. 19, 1946     3 Sheets-Sheet 3
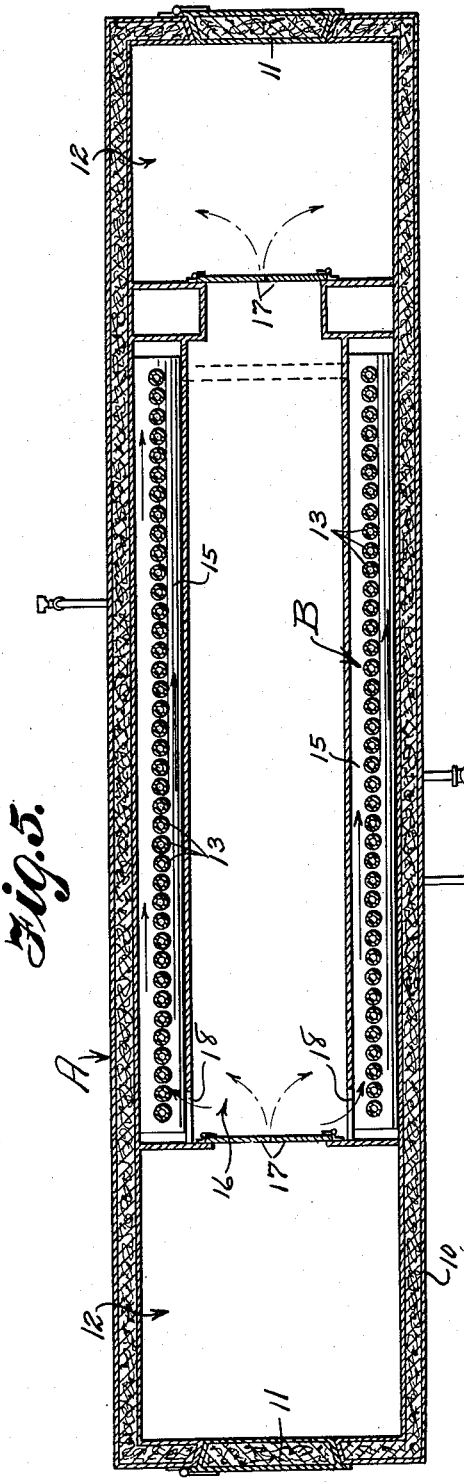
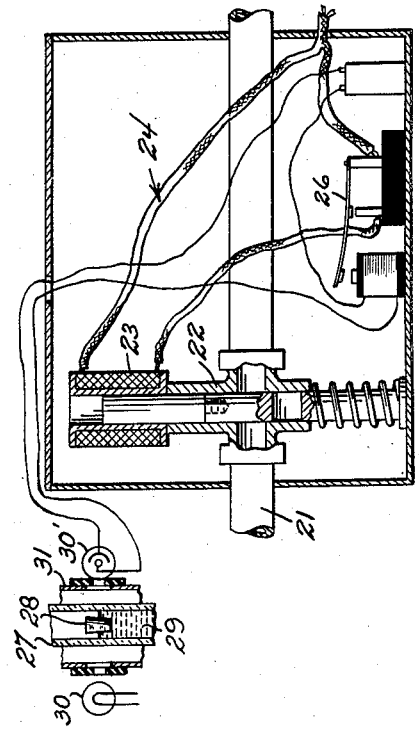
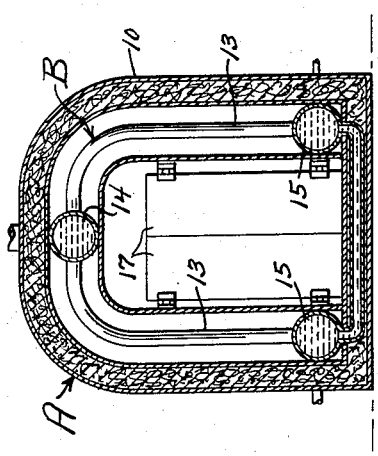
INVENTOR.
Thomas McGrath
BY Victor J. Evans & Co.
ATTORNEYS Patented Sept. 12, 1950

2,522,458

UNITED STATES PATENT OFFICE 2,522,458

FREEZING MACHINE

Thomas McGrath, Neptune, N. J.

Application February 19, 1946, Serial No. 648,678

3 Claims. (Cl. 62—8)

1

The invention relates to a freezing apparatus, and more especially to a low temperature quick freezing chamber.

The primary object of the invention is the provision of a chamber of this character, wherein foodstuff of all kinds can be quickly frozen. The chamber is equipped with a special type of vertical tube evaporator for assuring the highest point of efficiency. After the evaporator has been completely flooded with liquid ammonia or any other refrigerating liquid, the liquid absorbs the heat which causes the liquid to evaporate, the heat absorbed passing off in the form of gas or vapor, which being lighter than the liquid, passes to the top header or manifold and from this point directly to the machine through the suction line which is at the high point of the evaporating unit and is not allowed to return through any other part of such evaporator, the liquid delivered being automatically regulated and the tubes of such evaporator acting as individual units.

Another object of the invention is the provision of a chamber of this character, wherein there is arranged a novel air circulating system so designed that while the trays of products of any kind are within, the air is forced by a fan at one end of the chamber therethrough and returns through side vents, which are at the opposite end of the freezing area, and thus allowing the air to travel the full length of the said chamber and thus permitting the air to collect as much heat from the products being frozen as possible and in this manner assuring quick freezing operation.

A further object of the invention is the provision of a chamber of this character, which is simple in construction, thoroughly reliable and efficient in operation, automatically controlled, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a side view, partly broken away, of the chamber constructed in accordnace with the invention.

Figure 2 is an end elevation thereof.

Figure 3 is a sectional view taken on the line 3—3 of Figure 1, looking in the direction of the arrows.

Figure 4 is a sectional view taken on the line 4—4 of Figure 1, looking in the direction of the arrows.

2

Figure 5 is a sectional view taken on the line 5—5 of Figure 2, looking in the direction of the arrows.

Figure 6 is a sectional view taken on the line 6—6 of Figure 1, looking in the direction of the arrows.

Figure 7 is a detail sectional view, fragmentarily disclosed, of the automatic liquid level control mechanism for the chamber, and Figure 8 is a perspective view of the evaporator.

Similar reference characters indicate corresponding parts throughout the several views in the drawings.

Referring to the drawings in detail, the chamber constituting the present invention, comprises an elongated or rectangular shaped enclosure denoted generally at A, and involving an insulated housing or casing 10, provided at opposite ends with swinging doors 11, giving access to the interior of such housing or casing.

Within the housing or casing 10, midway thereof, and terminating removed from the opposite ends thereof, these creating vestibules 12 therein, is a vertically tubed evaporator denoted generally at B, which involves the vertically disposed arched tubes 13, top header 14 and bottom side headers 15, respectively, all being located about a freezing compartment 16, which is built within the said housing or casing 10 and closed at opposite ends by horizontally swinging doors 17. The doors 17 separate the compartment 16 from the vestibules 12, and access is had from the latter to such compartment on the opening of the said doors.

The walls of the housing or casing 10 and the compartment 16 enclose the tubes 13 and headers 14 and 15, while at opposite ends of the compartment 16 are air circulating windows 18 and 19, respectively, which create inlet and outlet courses to and from such compartment for forced air currents from an electric fan 20, which is supported next to the window 19 and carries the air through the enclosure for the tubes and headers, the flow course of the air being indicated by arrows in Figure 1 of the drawings.

The evaporator B is completely flooded with liquid ammonia or any other refrigerating liquid, and the supply thereto is had through an inlet liquid line 21 which is fitted with an automatic regulator, including a valve 22, controlled from an electric solenoid 23, in electric circuit connection, as at 24 with an electric eye or photoelectric cell arrangement and switch 26, respectively, the eye being located for association with the gauge glass 27, having the float 28 therein that is raised and lowered by the liquid therein, which liquid is denoted at 29. The electric elements of the eye comprises the light source or lamp 30 and the light sensitive cell 30' which are in direct line with each other and opposite to one another, as best seen in Figure 7 of the drawings, so that when the float 28 is raised by the liquid between the elements the beam of the lamp is broken and the valve 22 closes shutting off the flow of liquid to the evaporator B. The valve 22 stays closed until the evaporation of the liquid lowers the float so that the light beam passes over the latter and the valve 22 opens causing the liquid to flow in the evaporator. This operation continues on and off holding the liquid level the same in the evaporator B. The elements 30 and 30' of the eye are mounted in cork 31 so that the liquid glass 27, which is encased by the latter, will not become frosted and cause the electric eye to fail to operate. The glass 27 has the line 32 coupling with the evaporator B, as best seen in Figure 4 of the drawings.

It is to be understood that the evaporator shown in Figure 8 is merely for the purpose of illustration, since the number of tubes in the evaporator are not to be limited to any fixed number but will be governed by the capacity of the evaporator.

What is claimed is:

1. A chamber of the kind described, comprising a body forming an insulated enclosure, a freezing compartment within the enclosure formed by the body intermediate thereof, vestibules formed by the body outwardly of the compartment at opposite ends of the body and communicating with opposite ends of the compartment, doors closing the vestibules from the compartment, and a vertically tubed evaporator about the compartment.

2. A chamber of the kind described, comprising a body forming an insulated enclosure, a freezing compartment within the enclosure formed by the body intermediate thereof, vestibules formed by the body outwardly of the compartment at opposite ends of the body and communicating with opposite ends of the compartment, doors closing the vestibules from the compartment, a vertically tubed evaporator about the compartment, and an electrically controlled liquid refrigerant supply line connected to the evaporator.

3. A chamber of the kind described, comprising a body forming an insulated enclosure, a freezing compartment within the enclosure formed by the body intermediate thereof, a vertically tubed evaporator about the compartment, a controlled liquid refrigerant supply line connected to the evaporator, a valve in the supply line, a solenoid operating the valve, a gauge glass communicating with the evaporator, an electric eye arranged with the glass, an electric switch having circuit connection with the eye and solenoid, and a liquid float within the glass for cooperation with the eye to effect the automatic operation of the valve on the rise and fall of liquid within the evaporator.

THOMAS McGRATH.

REFERENCES CITED

The following references are of record in the file of this patent:

UNITED STATES PATENTS

| Number | Name | Date |
|---|---|---|
| 1,867,546 | Baer | July 19, 1932 |
| 1,930,414 | Buhr | Oct. 10, 1933 |
| 2,145,637 | Smith | Jan. 31, 1939 |
| 2,193,261 | Thomson | Mar. 12, 1940 |
| 2,254,420 | Cleveland | Sept. 2, 1941 |